Patented Feb. 5, 1946

2,394,278

UNITED STATES PATENT OFFICE 2,394,278

PROCESS FOR PURIFICATION OF CAROTENE

Monroe E. Wall, Oreland, and Edward G. Kelley, Whitemarsh, Pa., assignors to United States of America as represented by the Secretary of Agriculture No Drawing. Application September 8, 1944, Serial No. 553,261

15 Claims. (Cl. 260—666)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a new and useful process for purification of carotene.

Green leafy materials contain considerable quantities of carotene, which is an important source of vitamin A. The purification of carotene extracts from green leaf material for human or animal use customarily involves lengthy and difficult procedures. The chief pigment impurity found in such extracts is chlorophyll which may be present in quantities from 5 to 20 times the amount of carotene, depending on the nature of the extracting solvent. The other pigment impurity is xanthophyll, which is present in equal or somewhat higher ratio to carotene. Chlorophyll is by far the most objectionable impurity due to the fact that it gives carotene extracts an unattractive appearance, may decrease the stability of carotene to light, and if present in large amounts, may give objectionable taste and appearance to eggs from poultry fed such concentrates.

The present invention relates to the extraction of carotene from green leafy materials and the subsequent removal of most of the chlorophyll and some xanthophyll from this extract. The invention depends upon the facts, first, that chlorophyll is soluble in varying degrees in all common fat solvents such as petroleum ether, ether, chlorinated solvents, and alcohols, but insoluble in water or aqueous solvents; second, when chlorophyll is treated with an alkali under suitable reaction conditions, the two ester groupings in the chlorophyll molecule are saponified, and an alkali salt of chlorophyll is formed, which is is no longer soluble in fat solvents but is soluble in water, ethanol, methanol, diacetone alcohol and aqueous solutions of these solvents. Carotene and xanthophyll are not affected by the alkali treatment.

In order that the saponification reaction may proceed rapidly, it is necessary that the alkali be intimately mixed with the solvent containing the carotene, chlorophyll, and xanthophyll. The intimate mixture of alkali and extract is accomplished by dissolving the alkali in a water soluble solvent which is miscible with the extraction solvent. When such a mixture is boiled under reflux the chlorophyll is rapidly saponified. In order to separate the saponified products, the nature of the alkali containing solvent must be such that it is water soluble and on the addition of water, is no longer miscible with the extraction solvent. Correspondingly, the extraction solvent must be insoluble or only slightly soluble in water and aqueous solvents. In such a case, two layers will be formed, one consisting of the aqueous solvent containing alkali, the dissolved saponification products, and some xanthophyll, the other consisting of the extraction solvent containing the carotene, some xanthophyll and relatively little chlorophyll.

In general, our invention comprises the addition of a water soluble solvent containing alkali to a water insoluble extracting solvent containing a mixture of carotene, chlorophyll and xanthophyll, the two solvents being mutually miscible, but immiscible after the addition of water, and separation of the two solvent layers that form, the extraction solvent containing the purified carotene and the aqueous solvent containing the alkali, saponification products and some xanthophyll.

The carotene extract so obtained can be used as a crude provitamin A concentrate for stock and poultry feeds after removal of the solvent. Further purification with solvents, adsorbents, and combinations of solvents and adsorbents results in highly purified carotene concentrates suitable for human consumption.

The following examples will further illustrate this invention:

EXAMPLE

Ten pounds of dried broccoli leaves were extracted with 16 liters of Skellysolve B (a petroleum ether fraction boiling at 65° C. to 70° C. and essentially hexane). The petroleum ether extract was concentrated to 3 liters. (This extract is item No. 1 in Table 1, infra.) To it was added 1 liter of 95 percent ethanol containing 5 percent potassium hydroxide and the mixture boiled under reflux for one-half hour. The alkaline ethanol is completely miscible with petroleum ether under these circumstances. The concentration of alkali, time of boiling, and ratio of alcohol to petroleum ether may be varied within wide limits. The conditions described above, however, provide a maximum saponification of the chlorophyll in the shortest time and with the most economical use of chemicals. Sodium hydroxide or any other ethanol soluble alkali may be used instead of potassium hydroxide.

At the conclusion of the saponification, 188 ml. of water were added to the mixture. This amount of water is sufficient to convert the ethanol in the mixture to about 80 percent ethanol to 20 percent water. Such a concentration of ethanol is immiscible with the petroleum ether and it settles out into a lower layer with the petroleum ether constituting the upper layer. It is not critically important that the ethanol be 80 percent, since the alcohol becomes relatively immiscible with petroleum either at alcohol concentrations below 90 percent alcohol to 10 percent water. However, at concentrations above 80 percent alcohol the petroleum ether has a limited solubility in the aqueous ethanol, increasing as the alcohol concentration approaches 90 percent. At concentrations below 80 percent alcohol, the solubility of xanthophyll which is removed not because of any saponification but because of its solubility in aqueous alcohol, decreases rapidly as the concentration of alcohol falls. The concentration range of 75 percent to 85 percent ethanol will give maximum separation from petroleum ether together with maximum removal of xanthophyll. The ethanol layer contains the bulk of the chlorophyll saponification products, considerable xanthophyll but only a small quantity of carotene. It is withdrawn from the upper layer and discarded for the recovery of the ethanol. The petroleum ether layer contains carotene, some xanthophyll and relatively little chlorophyll. (This extract is item No. 2 in Table 1, infra.)

The carotene extract may be used as a crude provitamin A source after removing the solvent, or it may be further purified to remove any xanthophyll and unsaponified chlorophyll. For this further purification the above petroleum ether extract was divided into aliquots. One aliquot was stirred with 1.2 kilos of hydrated lime calculated on the basis of the whole extract, then filtered and washed with petroleum ether. This extract is item No. 3 in Table 1, infra. Another aliquot was treated with lime as above and then extracted with 80 percent ethanol. This alcohol-treated extract is item No. 4 in Table 1, infra. Another aliquot was extracted directly with 80 percent alcohol without lime treatment. This extract is item No. 5 in Table 1, infra. The degree of purification and yield of carotene are shown in said table which follows immediately.

This extract, which is greenish brown in appearance, is suitable for a crude provitamin A concentrate. In the above statement and in all following statements pertaining to the use of plant extracts for provitamin A concentrates, it is to be assumed that all the volatile solvents are removed and the residue used as such or dissolved in an edible oil. The lime treatment (Item 3 of Table 1) removes the remainder of the chlorophyll and about half the remaining xanthophyll. This extract has a clear deep red color and represents a purified carotene extract. As described in our copending application for patent, Serial No. 553,260, filed September 8, 1944, other adsorbents can also be used, and in some cases all the xanthophyll as well as all the chlorophyll can be removed in one adsorption operation. The 80 percent ethanol treatment (Item 4 of Table 1) following the lime treatment removes the remaining xanthophyll by virtue of the greater solubility of xanthophyll in 80 percent ethanol than in petroleum ether. The direct extraction of the petroleum ether with 80 percent ethanol, omitting the lime treatment (Item 5 of Table 1) yields an extract which is higher in carotene as based on percentage of total pigment than the lime treated extract, but contains some chlorophyll. This extract has a clear brownish red color and could be used as a provitamin A purified concentrate where the presence of small quantities of chlorophyll is not objectionable. The 80 percent alcohol treatment offers certain advantages over an adsorbent treatment in that the operation can be conducted with much less labor than the lime treatment and very efficient use of the alcohol. However, the process is intrinsically slower than the lime treatment and cannot produce a chlorophyll-free extract.

Alcohols other than 80 percent ethanol can be used for the purification of the carotene extract in petroleum ether. Ninety percent methanol and 93 percent diacetone alcohol can be used in the same manner, and the use of these alcohols in combination with the saponification procedure is to be considered part of this patent.

The saponification of carotene extract and ensuing purification of carotene have been found to apply to a wide range of petroleum ether solvents. Skellysolve F (essentially pentane B. P. 35° C.

TABLE 1

*Purification and yield of carotene*

| | Treatment | Carotene | | Xanthophyll | | Chlorophyll | |
|---|---|---|---|---|---|---|---|
| | | Mg. | Percent of total pigment | Mg. | Percent of total pigment | Mg. | Percent of total pigment |
| 1 | Extraction | 2,095 | 13.3 | 1,722 | 12.2 | 11,900 | 74.5 |
| 2 | Saponification | 1,936 | 54.3 | 853 | 23.9 | 774 | 21.8 |
| 3 | Saponification plus lime | 1,930 | 82.5 | 420 | 17.5 | 0 | 0.0 |
| 4 | Saponification plus lime plus alcohol | 1,930 | 97.2 | 50 | 2.8 | 0 | 0.0 |
| 5 | Saponification plus alcohol | 1,931 | 85.0 | 106 | 4.7 | 231 | 10.3 |

The extract obtained directly from a green plant material with a solvent, such as Extract 1 of Table 1, contains too much chlorophyll to be suitable for a carotene concentrate. After the saponification treatment (Item 2 of Table 1), 93.5 percent of the chlorophyll originally present is removed and 50.5 percent of the xanthophyll, while 92 percent of the carotene is recovered.

to 59° C.), Skellysolve B (essentially hexane B. P. 65° C. to 70° C.), and Skellysolve C (essentially heptane B. P. 88° C. to 98° C.), behave in identical manner. As shown in our said copending application for patent, the efficiency of adsorption from these solvents varies in the following decreasing order: Skellysolve F, Skellysolve B, and Skellysolve C. However, the advantage in using Skellysolve F for adsorption is balanced by the greater evaporation losses with this solvent.

The saponification of chlorophyll in solvents other than petroleum ether can be carried out in accordance with the general principles mentioned previously. An example is the use of trichloroethylene. One pound of dehydrated broccoli was extracted with 1 liter of trichloroethylene and the extract boiled with 300 ml. of 5 percent KOH in 95 percent ethanol for one-half hour. In order to make the trichloroethylene extract immiscible with the alcohol, it was necessary to add sufficient water to reduce the alcohol to 50 percent alcohol to 50 percent water. Higher ethanol concentrations were miscible in trichloroethylene. In this case the immiscible alkaline alcohol solution was lighter than the trichloroethylene so that the trichloroethylene extract became the lower layer and was drawn off. The results are shown in the following table:

TABLE 2

*Purification of carotene by saponification of a trichloroethylene extract*

| | Carotene | | Xanthophyll | | Chlorophyll | |
|---|---|---|---|---|---|---|
| Treatment | Mg. | Percent total pigment | Mg. | Percent total pigment | Mg. | Percent total pigment |
| 1 Extraction | 256 | 4.7 | 524 | 9.6 | 4,650 | 85.7 |
| 2 Saponification | 238 | 25.0 | 430 | 45.3 | 282 | 29.7 |
| 3 Saponification plus lime | | 32.9 | | 62.0 | | 5.1 |

The original extract (Item 1 of Table 2) was very dark green and very high in chlorophyll. After saponification (Extract 2 of Table 2) the extract was dark brown. Approximately 94 percent of the chlorophyll originally present was removed by the saponification procedure. Relatively little xanthophyll was removed during this operation or in subsequent attempts at extraction with 50 percent ethanol. The xanthophyll is only slightly soluble in 50 percent ethanol, and higher ethanol concentrations, as mentioned previously, do not separate from trichloroethylene. Treatment of the saponified extract with lime (Item 3 of Table 2) removed most of the remaining chlorophyll but did not remove xanthophyll. This extract was deep red in color, and is the only one of the above extracts that would be suitable for a vitamin concentrate. The trichloroethylene extracts corresponding to Item 2 and Item 3 of Table 2 can be further purified by evaporating the solvent in vacuo, dissolving the residue in petroleum ether and purifying as described previously for purification of petroleum ether extracts.

The use of chlorinated solvents such as trichloroethylene has the advantage of eliminating fire and explosion hazards, but carotene extracts thus prepared can not be purified as extensively as petroleum ether extracts due to the solubility relationship between the chlorinated solvents and alcohol and also to the weaker adsorption of impurities from a chlorinated solvent. In such cases, the large scale extraction and saponification reactions could take place in trichloroethylene or other chlorinated solvents, after which the solvent is evaporated. The residue can then be dissolved in a relatively small volume of petroleum ether and further purification be carried out. In this way, fire and explosion hazards could be decreased and at the same time a purified carotene concentrate be obtained.

Having thus described our invention, we claim:

1. In the purification of carotene in a water insoluble solvent contaminated with chlorophyll and xanthophyll, the steps comprising adding to the said solution a water soluble solvent containing dissolved alkali, the alkaline water soluble solvent being miscible with the water insoluble solvent, boiling the resulting mixture, adding sufficient water to make the resultant mixture of water-water soluble solvent which contains the alkali, chlorophyll saponification products, and xanthophyll, immiscible in the water insoluble solvent, permitting the immiscible portions to separate into layers, and removing the alkaline aqueous solvent mixture.

2. In the purification of carotene in a water insoluble solvent contaminated with chlorophyll and xanthophyll, the steps comprising adding to the said solution 95 per cent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the water insoluble solvent, permitting the immiscible portions to separate into layers, and removing the alkaline aqueous solvent mixture.

3. In the purification of carotene in a water insoluble solvent contaminated with chlorophyll and xanthophyll, the steps comprising adding to the said solution 95 per cent ethanol containing 5 per cent sodium hydroxide, boiling the resulting mixture, adding sufficient water to make the resultant mixture of water-95 percent ethanol which contains the alkali, chlorophyll saponification products, and xanthophyll, immiscible in the water insoluble solvent, permitting the immiscible portions to separate into layers, and removing the alkaline aqueous solvent mixture.

4. In the purification of carotene in one of a group of petroleum ethers consisting essentially of pentane, hexane, and heptane contaminated with chlorophyll and xanthophyll, the steps comprising adding to the said solution 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in one of a group of petroleum ethers consisting essentially of pentane, hexane, and heptane, permitting the immiscible portions to separate into layers, and removing the alkaline aqueous solvent mixture.

5. In the purification of carotene in a chlorinated solvent contaminated with chlorophyll and xanthophyll, the steps comprising adding to the said solution 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in a chlorinated solvent, permitting the immiscible portions to separate into layers, and removing the alkaline aqueous solvent mixture.

6. In the purification of carotene in a water insoluble solvent contaminated with chlorophyll and xanthophyll, the steps comprising adding to the said solution a water soluble solvent containing dissolved alkali, the alkaline water soluble solvent being miscible with the water insoluble solvent, boiling the resulting mixture, adding sufficient water to make the resultant mixture of water-water soluble solvent which contains the alkali, chlorophyll saponification products, and xanthophyll, immiscible in the water insoluble solvent, permitting the immiscible portions to separate into layers, and removing the alkaline aqueous solvent mixture, followed by isolation of the carotene in the water insoluble solvent portion.

7. In the purification of carotene in a solvent selected from the group consisting of pentane, hexane, and heptane contaminated with chlorophyll and xanthophyll, the steps comprising adding to the carotene-containing solvent 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture, further purifying the carotene in the solvent by adsorption of impurities on hydrated lime, followed by filtering and washing with the solvent.

8. In the purification of carotene in a solvent selected from the group consisting of pentane, hexane, and heptane contaminated with chlorophyll and xanthophyll, the steps comprising adding to the carotene-containing solvent 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture, further purifying the carotene in the solvent by adsorption of impurities on hydrated lime, followed by filtering and washing with the solvent and extracting the filtrate with 75 percent to 85 percent ethanol.

9. In the purification of carotene in a solvent selected from the group consisting of pentane, hexane, and heptane contaminated with chlorophyll and xanthophyll, the steps comprising adding to the carotene-containing solvent 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture, further purifying the carotene in the solvent by adsorption of impurities on hydrated lime, followed by filtering and washing with the solvent and extracting the filtrate with 80 percent to 90 percent methanol.

10. In the purification of carotene in a solvent selected from the group consisting of pentane, hexane, and heptane contaminated with chlorophyll and xanthophyll, the steps comprising adding to the carotene-containing solvent 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture, further purifying the carotene in the solvent by adsorption of impurities on hydrated lime, followed by filtering and washing with the solvent and extracting the filtrate with 90 percent to 95 percent diacetone alcohol.

11. In the purification of carotene in a chlorinated solvent contaminated with chlorophyll and xanthophyll, the steps comprising adding to the said solution 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in a chlorinated solvent, permitting the immiscible portions to separate into layers, and removing the alkaline aqueous solvent mixture and further purifying the carotene by adsorption of impurities on hydrated lime, filtering and washing with the solvent.

12. In the purification of carotene in a solvent selected from the group consisting of pentane, hexane, and heptane contaminated with chlorophyll and xanthophyll, the steps comprising adding to the carotene-containing solvent 95 per cent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture and further purifying the carotene in the solvent by extraction with 75 percent to 85 percent ethanol.

13. In the purification of carotene in a solvent selected from the group consisting of pentane, hexane, and heptane contaminated with chlorophyll and xanthophyll, the steps comprising adding to the carotene-containing solvent 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture and further purifying the carotene in the solvent by extraction with 80 percent to 90 percent methanol.

14. In the purification of carotene in a solvent selected from the group consisting of pentane, hexane, and heptane contaminated with chlorophyll and xanthophyll, the steps comprising adding to the carotene-containing solvent 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in the solvent, permitting the immiscible portions to separate into layers, and removing the alkaline aqueous solvent mixture and further purifying the carotene in the solvent by extraction with 90 percent to 95 percent diacetone alcohol.

15. In the purification of carotene in a chlorinated solvent contaminated with chlorophyll and xanthophyll, the steps comprising adding to the said solution 95 percent ethanol containing 5 percent potassium hydroxide, boiling the resulting mixture, adding sufficient water to make the resultant mixture of water-95 percent ethanol which contains the alkali, chlorophyll saponification products, and xanthophyll, immiscible in a chlorinated solvent, permitting the immiscible portions to separate into layers, and removing the alkaline aqueous solvent mixture, evaporating the solvent containing the carotene to near dryness, dissolving the residue in a small quantity of petroleum ether and purifying the resulting petroleum ether extract in any desirable manner.

MONROE E. WALL.
EDWARD G. KELLEY.